Dec. 6, 1927.

J. K. BRODERICK 1,651,369

CAMERA

Filed March 8, 1926

Inventor:
John K. Broderick,
by Cooper & Kingsland
His Attorneys.

Patented Dec. 6, 1927.

1,651,369

UNITED STATES PATENT OFFICE.

JOHN K. BRODERICK, OF KIRKWOOD, MISSOURI.

CAMERA.

Application filed March 8, 1926. Serial No. 93,131.

This invention relates to improvements in cameras and more particularly to a closure for the lens opening in connection with a lock for the shutter operating mechanism.

An object of the invention is to provide means for closing the lens opening of a camera so that the shutter frame may be removed without exposing the film in the camera, with provision whereby the camera is locked against operation when the lens opening is closed.

Additional detailed advantages will be apparent from the following description thereof, taken in connection with the accompanying drawing in which, Fig. 1 is an elevation of the lens frame of the camera with the associating device of the invention;

Figure 1:
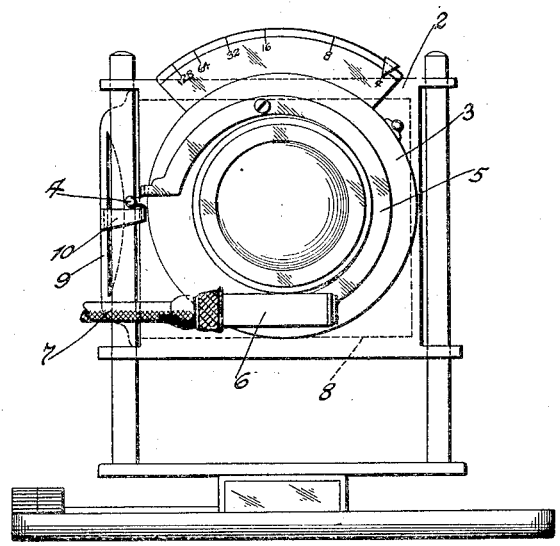
Figure 2:
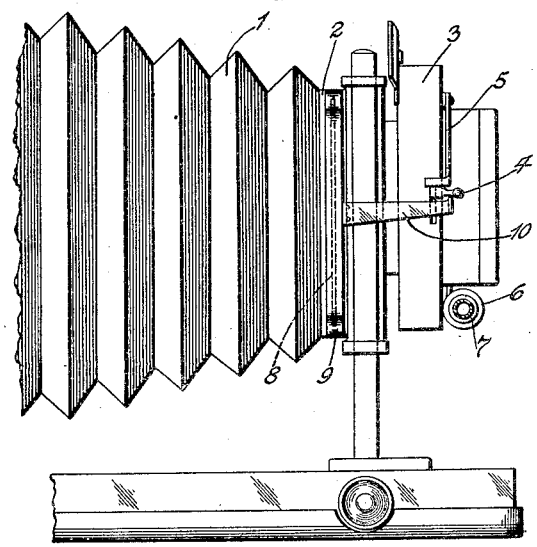
Fig. 2 is a side elevation.
Figure 3:
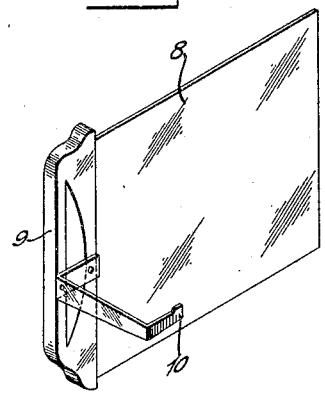
Fig. 3 is a detail view of the slide for closing the lens opening.

In the embodiment of the invention, the device is shown as applied to a bellows camera having a bellows 1 at the forward end of which is mounted the lens frame 2. The lens opening to the bellows is through the lens frame 2. The lens unit 3 is adapted to be removably connected into the lens frame. The shutter operating mechanism, which includes the shutter operating lever 4, one end of which projects to the side of the lens unit, is incorporated in the lens unit. This lever may be manually operated by depressing it or may be automatically operated through the segment 5 which is tripped by the piston 6 of the bulb device 7.

When changing the lens unit, and in order to close the lens opening to the bellows, a slide 8 is adapted to be inserted in the lens frame 2 at one side thereof and to extend across the lens opening to the bellows. This slide is provided with an end piece 9 which carries a U-shaped lever 10, the forward arm of which is arranged to project below the shutter operating lever 4, so that when the slide is in position to close the opening in the lens frame, the shutter operating mechanism cannot be operated.

In exchanging lenses, the slide is first inserted to close the lens opening to the bellows and the lens unit may then be removed without exposing the film mounted in the camera. When the new lens unit is inserted, the arm 10 projects below the shutter operating lever and prevents the operation of that lever until the slide has been removed, thus preventing the use of the camera when the lens opening to the bellows is closed.

I am aware that the invention may be modified in various particulars without departure from the spirit and scope thereof; but what I claim and desire to secure by Letters Patent is:

1. In a camera, the combination of an exposure chamber having a lens frame providing a lens opening, a lens unit removably connected with said lens frame, shutter operating mechanism incorporated in said lens unit, a slide for closing the lens opening, and means connected with said slide for locking the shutter operating mechanism when said slide is in a position to close said lens opening.

2. In a camera, an exposure chamber having a lens opening, a lens unit connected into said lens opening, a closure for said lens opening, shutter operating mechanism, and means connected with said closure for locking the shutter operating mechanism when said closure is in position to close said lens opening.

JOHN K. BRODERICK.